United States Patent Office 3,627,469
Patented Dec. 14, 1971

3,627,469
EXPOSURE AND STERILIZATION INDICATORS COMPRISING SUBSTITUTED PYRIDINES, QUINOLINES, AND/OR ISOQUINOLINES
Shu-Sing Cheng, Carpentersville, Ill., assignor to The Kendall Company, Walpole, Mass.
No Drawing. Continuation-in-part of abandoned application Ser. No. 721,206, Apr. 15, 1968. This application Apr. 27, 1970, Ser. No. 32,460
Int. Cl. G01n 21/06
U.S. Cl. 23—232 R          28 Claims

ABSTRACT OF THE DISCLOSURE

Exposure and sterilization indicators suitable for use in monitoring a sterilization process employing dry heat or an alkylating agent, such as ethylene oxide, as the sterilization agent are disclosed. The indicators, which function by means of change in color, comprise carrier members bearing selected substituted pyridines, quinolines, and/or isoquinolines.

---

This application is a continuation-in-part of copending application Ser. No. 721,206, filed Apr. 15, 1968, now abandoned.

This invention relates to exposure and sterilization indicators and, more particularly, to indicators for monitoring sterilization processes employing dry heat or an alkylating agent as the sterilization agent.

The use of dry heat as a sterilization agent has been known for some time. Although other sterilization techniques have become popular in recent years, the simplicity of the dry heat method makes it convenient for the sterilization of many articles, particularly those which cannot be sterilized with moist heat, or by chemical treatment.

In the sterilization of hospital supplies, such as surgical instruments, dressings, gloves, plastic syringes, and various other medical devices, there is a growing trend toward the use of alkylating agents as the sterilization agent. The most popular sterilizing alkylating agent presently employed is ethylene oxide gas, generally in admixture with an inert gaseous diluent, such as carbon dioxide, nitrogen, trichloromonofluoromethane, dichlorodifluoromethane, and the like. Since ethylene oxide gas readily diffuses through all of the commonly employed packaging materials and is highly effective in killing microorganisms at temperatures well below those required for heat sterilization techniques, it enables efficient sterilization of many items, particularly those made of thermoplastic materials, which cannot withstand heat sterilization.

The effectiveness of sterilization with alkylating agents such as ethylene oxide is dependent on the over-all effect of several parameters, the most important of which are the temperature within the sterilization chamber and the extent of exposure to the sterilizing agent. Temperature and extent of exposure are interrelated, with the extent of exposure necessary for sterility varying inversely with the temperature. The extent of exposure is the combined effect of two factors, namely, the concentration of the sterilizing agent within the sterilization chamber, generally expressed as the weight of sterilizing agent per unit volume of space within the chamber, and the length of the exposure period. The extent of exposure can be defined mathematically as the product of these two factors and expressed in units such as milligram-hour per liter. A long-standing problem associated with this type of sterilization has been the lack of a satisfactory monitoring device for indicating that the treated material has, in fact been subjected to an extent of exposure to the sterilizing agent sufficient to render it sterile under given conditions within the sterilization chamber.

While the presence of moisture in the sterilization chamber is not essential to sterilization with alkylating agents, it has been found that the bactericidal and sporicidal activity of the alkylating agent is highest in the range of about 40% to about 70% relative humidity. When moisture is present, the relative humidity is generally read directly from a hygrometer employing electronic sensing devices. However, this reading indicates only the relative humidity in the chamber environment, and fails to indicate the true relative humidity inside the package containing the items being sterilized. This failure is understandable, since packaging materials vary in water vapor permeability, and thus may constitute a moisture barrier.

Several indicators previously suggested for use with ethylene oxide sterilization change color when exposed to ethylene oxide by a mechanism involving the change from a lower to a higher pH. By incorporating a sufficient amount of acid in these indicators they can be designed so that the color change occurs after an extent of exposure to ethylene oxide sufficient to render sterility to the material being treated. Indicators of this type are disclosed in U.S. Pat. No. 2,998,306, U.S. Pat. No. 3,098,751, and U.S. Pat. No. 3,258,312. However, these indicators are not specifically alkylation indicators, but are essentially merely pH indicators. Thus, their color changing sensitivities can be affected by the pH of the atmosphere to which they have been exposed, and the color change can occur upon exposure to a large number of alkaline materials which have no sterilizing capabilities. Moreover, once the color change does occur, it can be reversed by acidic components in the atmosphere. This lack of specificity to ethylene oxide or other alkylating agents seriously detracts from the reliability of this type of indicator as a true sterilization indicator.

A compound proposed for use as an exposure indicator for ethylene oxide sterilization has been described in the literature. Thus, Brewer and Arnsberger in Journal of Pharmaceutical Sciences, vol. 55, No. 1, January 1966, pages 57–59, disclose that 4-(4'-nitrobenzyl) pyridine reacts with ethylene oxide to form a dye which is blue in an alkaline medium. Although this indicator has a high degree of specificity to ethylene oxide, the fact that it is too highly sensitive to this alkylating agent limits its utility to that of an exposure indicator, indicating merely that the material being treated has been exposed to ethylene oxide. In order to determine whether the extent of exposure to the alkylating agent has been sufficient to render sterility to the material being treated, it is necessary to rely upon the use of positive spore controls and then assay the effectiveness of kill, a procedure which has the disadvantage of being rather inconvenient and time consuming. Furthermore, the color change exhibited by this exposure indicator is inhibited by the presence of carbon dioxide, the principal inert diluent gas commonly employed with ethylene oxide.

Now it has been found in accordance with this invention that the problems associated with the prior art indicators can be obviated by the use of selected substituted pyridines, quinolines, and isoquinolines as indicating compounds.

The indicators of this invention, which are useful both as exposure and sterilization indicators, have a high degree of specificity to alkylating agents, enabling them to exhibit visibly a color change upon being subjected to the appropriate extent of exposure. These indicators are capable of developing a color change even in the presence of carbon dioxide and other inert gaseous diluents which are commonly employed in admixture with an alkylating agent. Furthermore, these indicators are useful over a wide range of sterilization temperatures.

The indicators are reliable in that, by the nature of their chemical sensitivities and by the proper choice of concentration, they can be constructed to change color only upon exposure to conditions sufficient to render sterile the material being treated, in contrast to the aforementioned 4-(4'-nitrobenzyl) pyridine whose sensitivity precludes such usage. Furthermore, the indicators are operable to indicate sterilization without the use of positive spore controls.

Another important feature of the indicators of this invention is their ability not only to indicate sterility, but also to quantitatively indicate the margin of safety in sterility, i.e., the extent of exposure to the sterilizing agent in excess of the minimum required to render sterility to the material being treated. In practice, a wide margin of sterility safety is required in order to eliminate the possibility of having non-sterile areas within the package being sterilized due to the sterilizing agent not adequately reaching all of the intricate spaces within the package. Heretofore, the margin of safety in sterility has been difficult to quantitatively determine. The indicators of this invention enable this determination to be made by reason of the fact that after their initial color change has occurred, the hue and intensity of the color developed continues to change with additional exposure to the sterilizing alkylating agent and is correlatable to the extent of exposure in excess of that required to effect the initial color change. Thus, by comparing the final hue and intensity of the color of the sterility indicators of this invention after the sterilization cycle, with a known standard as, for example, a color chart supplied with the indicator and calibrated in extent of exposure units, e.g., milligram-hour per liter at a given temperature and relative humidity, the margin of safety in sterility readily can be quantitatively determined.

An additional feature of the indicators of this invention is their ability to indicate the approximate range of the relative humidity at the target area within the immediate package where the items undergoing sterilization by use of an alkylating agent are contained. Thus, the effect of the low, medium and high relative humidity on the appearance of the colored indicia is clearly distinguishable in general as "fresh, sharp and well defined," "dull and diffused" and "soaked or well-washed," respectively. This feature of the invention will enable the control of the sterilizing process by regulating the amount of steam addition to attain the maximum efficiency of the sterilization reaction.

The indicators of this invention are also suitable for use in monitoring a dry heat sterilization process, wherein the items to be sterilized are treated in a hot-air chamber, generally at about 160°–170° C. for one hour or more depending on the nature of the items. In the dry heat sterilization process, these indicators also function both as exposure and sterilization indicators, depending on the concentration of indicating compound employed.

More in detail, the indicators of this invention comprise a carrier member bearing at least one indicating compound selected from the group consisting of

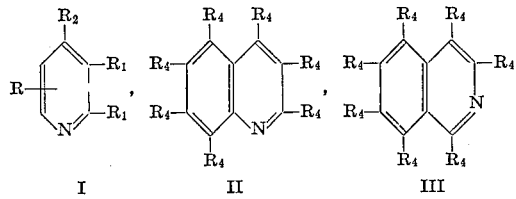

I      II      III and salts thereof, wherein at least one and not more than two of the $R_1$ and $R_2$ groups are hydrogen; $R_1$ and $R_2$ are independently selected from the group consisting of hydrogen,

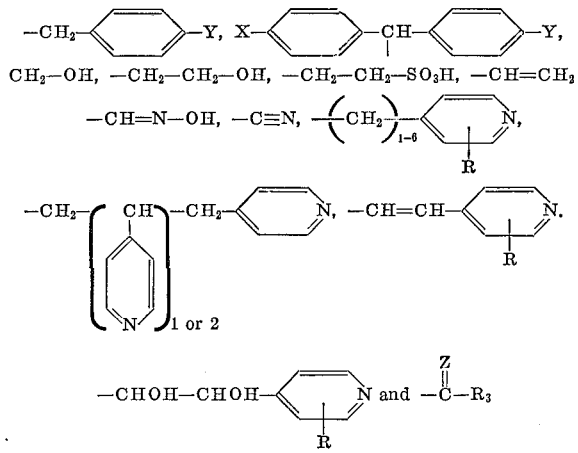

$R$ is hydrogen, halogene or alkyl; $X$ is hydrogen, —N=O, —NO$_2$, —OH, —SH, —CH=N—OH, alkyl or halogen; $Y$ is hydrogen, —N=O, —OH, —SH, —CH=N—OH, alkyl or halogen; $Z$ is oxygen or sulfur; $R_3$ is —OH, —NH$_2$, —NH—NH$_2$ or alkoxyl; at least one of the $R_4$ groups is —OH, —SH or —CH=N—OH, and the other $R_4$ groups are hydrogen. Preferably, not more than two $R_4$ groups are other than hydrogen.

The salts of the bases described above may be either organic acid salts, such as acetates, benzoates, salicylates and the like, or inorganic acid salts, such as hydrohalides, nitrates, sulfates, phosphates and the like.

The compounds employed in the construction of the indicators of this invention are known compounds which are readily prepared by various synthetic procedures. For example, compounds I wherein $R$ is hydrogen, halogen or alkyl having 1 to 4 carbon atoms; $R_1$ is hydrogen and $R_2$ is

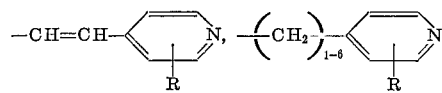

or

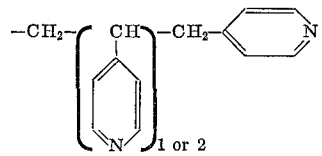

are provided etiher by the action of sulfur on 4-picoline or by the condensation of the appropriate substituted 4-picoline with a substituted 4-pyridylaldehyde as described by Thayer and Corson in J. Am. Soc., 70, 2330 (1948). The same class of compounds I wherein $R_2$ is

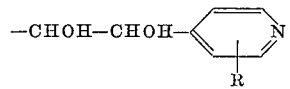

is prepared by the Cannizaro-like reaction of appropriate isonicotinaldehydes with suitable isonicotinic acids.

Compounds I where one of the $R_1$ and $R_2$ groups is —CH$_2$OH or —CH$_2$—CH$_2$—OH are prepared by the reaction of nitrous acid on an appropriate side-chain pyridylamine according to the procedure described by La Forge in J. Am. Chem. Soc., 50, 2484 (1928) or by Wibart and Overhoff in Rec. Trav. Chim., 52, 55 (1933). Where compounds I in which $R_1$ or $R_2$ is

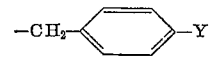

are desired, they are readily provided by the reduction of benzoylpyridine following the general process described by Tschitschibabin in J. Russ Phys.-Chem. Soc., 33, 249 (1901) by La Forge in J. Am. Chem. Soc., 50, 2484 (1928). Compounds I wherein $R_1$ or $R_2$ is —CH=N—OH are preparted by reacting the corresponding pyridylaldehyde with hydroxylamine; those compounds I in which $R_2$ is

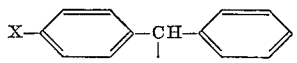

are provided by reduction of the corresponding carbinols, which are obtained from the reaction of the phenyl pyridyl ketone with phenyl magnesium bromide as described by Tschitschibabin and Benewolenskaja in Chem. Ber., 61 551 (1928).

A typical procedure for the preparation of compounds having the Formula II wherein one of the $R_4$ groups is —SH comprises treating the appropriate chloro derivative with NaSH as described by Albert and Barlin in J. Chem. Soc., p. 2384 (1959).

Compounds having the Formula III wherein one of the $R_4$ groups is —OH are conveniently prepared from the corresponding homophthalimide by hydrolysis of the methoxy or bromo derivative as described by Osborn et al. in J. Chem. Soc., p. 4194 (1956).

While any of the compounds included within the scope of Formulas I, II and III can be employed in the practice of this invention, preferred embodiments utilize those compounds having the Formula I wherein at least one and not more than two of the $R_1$ and $R_2$ groups are hydrogen; $R_1$ is hydrogen or

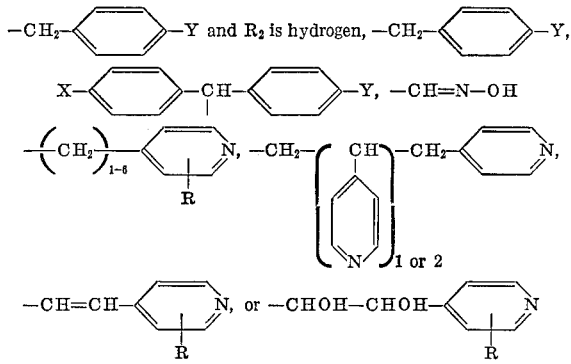

and X, Y and R are independently selected hydrogen, halogen, or alkyl having 1 to 4 carbon atoms.

The indicator devices of this invention are prepared by applying a composition comprising one or more of the above indicating compounds to a suitable carrier member, such as paper, cardboard, plastic film, cloth, foil, gauze, fiberglass or the like. The indicating compounds are conveniently applied as an air-dryable solution or suspension to the carrier member by various techniques, such as dipping, spraying, painting or printing. A number of organic solvents are suitable for forming solutions of the indicating compounds, including acetone, methanol, tetrahydrofuran, ethylene glycol, propylene glycol, glycerol, monoethers of ethylene glycol, monoethers of propylene glycol, and the like. These solvents are generally employed in amounts to provide solutions containing from about 0.1 to about 40% by weight of the indicating compound. Low viscosity organic solvents having boiling points within the range of from about 40° to about 70° C., such as acetone, methanol and tetrahydrofuran, have been found to be most suitable for formulating dipping solutions, while intermediate viscosity organic solvents having boiling points of at least about 100° C., such as ethylene glycol, propylene glycol, glycerol, monoethers of ethylene glycol and monoethers of propylene glycol, have been found to be most suitable for formulating printing inks. Such printing inks are generally employed without any coloring agent to form colorless, invisible indicia which will develop color and become visible when exposed to a sufficient amount of alkylating agent to effect the color change of the indicating compound. It is also feasible to formulate the inks with light pigments which will not preclude a color change when subjected to the desired amount of sterilizing agent.

Several forms of carrier member can conveniently be employed with the invention. For example, the telltale indicia may be printed directly on the package containing the goods to be sterilized. Alternatively, the carrier member may be sheeted material either in the form of a roll of tape or cut into convenient-sized strips or labels which can be attached to the outside of the package or, if the package is transparent, inserted inside the package. The sheeted material may be provided with a pressure-sensitive or solvent-activatable adhesive to facilitate its attachment to the package. In the form of an adhesive tape, the carrier member can also serve to seal the package.

By proper selection of one or more of indicating compounds set out above and the concentration thereof applied to the carrier member, the indicator devices of the invention can be designed to exhibit their initial color change at various selected extents of exposure to the sterilizing agent ranging from brief extents of exposure to extents of exposure sufficient to render sterility to the material being treated. With any given indicating compound of the invention, the extent of exposure at which the indicator will exhibit its initial color change varies inversely with the concentration of the indicating compound on the carrier member. Thus, the same indicating compound can be used in a relatively high concentration to provide an exposure indicator to indicate by its initial color change merely that the material being treated has been exposed to the sterilizing agent, or it can be used in a relatively low concentration to provide a sterility indicator to indicate by its initial color change that the material being treated has been subjected to an extent of exposure to the sterilizing agent sufficient to render it sterile. Moreover, since the hue and intensity of the initial color developed by the indicating compounds of this invention will continue to change with additional exposure to the alkylating agent, it is also possible to use the same indicating compound in an intermediate concentration to provide a sterility indicator which indicates sterility not by its initial color change but by a subsequent change in the hue or intensity of its color.

In preparing the indicator devices of the invention, the concentration of the indicating compound on the carrier member is controlled both by the concentration of the indicating compound in the composition applied to the carrier member and by the thickness in which the composition is applied. Where a very thin application is desired, such application is most suitably carried out by a printing technique, which enables a fined control of thickness than does dipping.

The extent of exposure to the sterilizing agent at which the indicator devices of the present invention exhibit their color changes also varies inversely with the temperature at the target area, in substantially the same relationship as the extent of exposure sufficient for rendering sterility to the material being treated varies inversely with the temperature of treatment. Since the indicator devices thus actually measure the integrated effect of extent of exposure and temperature, they can reliably be used within the ranges of temperature and relative humidity ordinarily employed.

When monitoring a sterilization cycle, it is often advantageous to employ both a sterility indicator and an exposure indicator at the same target area. For example, if at the end of the sterilization cycle the sterility indicator at a particular target area fails to indicate sterility, it would be desirable to know whether or not the sterilizing agent has at least been reaching that target area. An exposure indicator at the same target area would provide that information. Therefore, a particularly useful form of the present invention is a combination exposure indicator and sterility indicator.

Such a combination indicator may readily be prepared by printing on a single carrier member, such as a paper strip, two sets of indicia, both of which preferably are initially colorless and invisible. The first set of indicia, which, for example, may take the form of the word "EXPOSED," is printed with an ink formulation containing at least one of the indicating compounds of this invention, which is designed to provide indicia exhibiting a color change upon being subjected to a brief extent of exposure to the sterilizing agent. The second set of indicia, which, for example, may take the form of the word "STERILE," is printed with a second ink formulation containing at least one of the indicating compound of this invention, which is designed to provide indicia exhibiting a color change upon being subjected to an extent of exposure to the sterilizing agent sufficient to render sterility to the material being treated. Thus, when using this form of indicator device for monitoring a sterilization cycle, the message "EXPOSED" will visibly appear early in the sterilization cycle as an indication that the material being treated has at least been in contact with the sterilizing agent, and the message "STERILE" will visibly appear at a later period in the sterilization cycle as an indication that the material being treated has in fact, been subjected to an extent of exposure to the sterilizing agent sufficient to render it sterile. The developed color will remain stable for a long period of time without fading away. Hence, when the sterilized material is stored with the indicator for some time prior to use, the indicator will also serve as a reliable indication to the ultimate user that the material has previously been rendered sterile.

The method of this invention comprises exposing to an alkylating agent or dry heat the material to be sterilized and an indicator comprising at least one of the previously described indicating compounds having the formula I, II or III, and maintaining said alkylating agent or dry heat in contact with said material and said indicator at least until a color change occurs in said indicator. Where the extent of exposure is sufficient to render sterile the material being treated, in addition to the aforementioned indicating compounds, those having the formula I wherein $R_1$ is

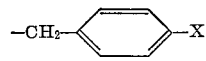

can also be employed.

The alkylation indicators of the present invention detect the presence of an extent of exposure to alkylating agents in liquid as well as gaseous phase. For example, the indicators may be used for monitoring gas sterilization processes employing sterilizing alkylating agents such as ethylene oxide, propylene oxide and β-propiolactone. Liquid phase alkylating agents to which the indicators of the invention are sensitive include, among others, ethylenimines, alkyl sulfates, alkyl halides, nitrogen mustards, aziridines, sulfonic esters, and epoxides. However, lower epoxides having two or three carbon atoms and particularly ethylene oxide, are preferred alkylating agents.

The following examples, which are given for purpose of illustration only, further illustrate the practice of the present invention.

EXAMPLE 1

A sterilization indicator was prepared by immersing a 1 1/16-inch by 5/16-inch strip of Whatman No. 1 chromatographic paper into a 1.25% by weight solution of 4-pyridinealdoxime in acetone, and allowing it to air-dry. For control purposes, chemical-biological sterilization indicators were prepared by immersing two identical strips into the same solution containing viable spores of *Bacillus globigii* in a concentration of approximately 5 million spores per milliliter, and allowing them to air-dry. The three indicators, initially colorless, were then placed in a chamber and subjected to an atmosphere containing 10% ethylene oxide and 90% carbon dioxide at 130° F. and 40% relative humidity, the ethylene oxide concentration within the chamber being 430 milligrams per liter. After approximately 15 minutes, all three indicators were observed to develop a pale yellow color. One of the chemical-biological indicators was then removed from the chamber for sterility testing. The two indicators remaining in the chamber, upon continued exposure to the ethylene oxide gaseous atmosphere, gradually intensified in color and became dark yellow after about 1 hour. The second chemical-biological indicator was then removed from the chamber for sterility testing. The chemical indicator still remaining in the chamber, upon continued exposure to the ethylene oxide gaseous atmosphere, gradually and uniformly exhibited further color changes, becoming light brown, then brownish red, and finally brick-red.

Sterility testing of the chemical-biological indicators was carried out by a standard technique for culturing the indicators in sterile thioglycolate broth at 35° C. for 20 days. Testing of the pale yellow indicator (14 minute exposure) resulted in microbial growth, indicating that sterility had not been attained. With respect to the dark yellow indicator (one hour exposure), however, the test resulted in no visible microbial growth, indicating that sterility had been attained.

EXAMPLE 2

Ink compositions were prepared containing the following ingredients in the following parts by weight;

|  | Ink A | Ink B |
| --- | --- | --- |
| Ethylene glycol | 715 | 715 |
| 4-benzylpyridine | 385 | 385 |
| 5-hydroxyquinoline | 10 | 1.5 |

A chemical sterilization indicator was prepared by printing on a strip of 400 bond white paper the word "EXPOSED" with Ink A and the word "STERILE" with Ink B, and allowing it to air-dry. Both sets of indicia were colorless and invisible. For control purposes, a chemical-biological sterilization indicator was prepared by impregnating a strip of Whatman No. 1 chromatographic paper with viable spores of *Bacillus globigii*, and then printing indicia thereon with Ink B. The two indicators were then placed in a chamber and subjected to an atmosphere containing 10% ethylene oxide and 90% carbon dioxide at 130° F. and 40% relative humidity, the ethylene oxide concentration within the chamber being 430 milligrams per liter. After about 10 minutes, the word "EXPOSED" developed a pink color and became visible. After approximately 1 hour, both the word "STERILE" on the chemical indicator and the indicia on the chemical-biological indicator developed a pink color and became visible. At this point, the chemical-biological indicator was removed from the chamber for sterility testing as described above in Example 1. The test resulted in no visible growth, indicating that sterility had been attained. The chemical indicator remaining in the chamber, upon continued exposure to the ethylene oxide gaseous atmosphere, exhibited a gradual and uniform change in the hue and intensity of its initially developed color, becoming reddish orange and then red after about 2 hours.

EXAMPLE 3

Ink compositions were prepared containing the following ingredients in the following parts by weight:

|  | Ink C | Ink D |
| --- | --- | --- |
| Ethylene glycol | 44.6 | 206 |
| 4-benzylpyridine | 10.7 | 113 |
| Meso-1,2-bis-(4-pyridyl)-1,2-ethanediol | 3.0 |  |
| 1,2-bis-(4-pyridyl)-ethane |  | 2.5 |
| 4-pyridinealdoxime |  | 15 |

A chemical sterilization indicator was prepared by printing on a strip of 400 bond white paper the word "EXPOSED" with Ink C and the word "STERILE" with Ink D, and allowing it to air-dry. Both sets of indicia were colorless and invisible. For control purposes, a chemical-biological sterilization indicator was prepared by impregnating a strip of Whatman No. 1 chromatographic paper with viable spores of Bacillus globigii, and then printing indicia thereon with Ink D. The two indicators were then placed in a chamber and subjected to an atmosphere containing 12% ethylene oxide and 88% dichlorodifluoromethane at 130° F. and 40% relative humidity, the ethylene oxide concentration within the chamber being 430 milligrams per liter. After 10 minutes, corresponding to an extent of exposure of 72 milligram-hours per liter, the word "EXPOSED" developed a yellow color and became visible. At the end of 20 minutes, corresponding to an extent of exposure of 144 milligram-hours per liter, both the word "STERILE" on the chemical indicator and the indicia on the chemical-biological indicator developed a yellow color and became visible. At this point, the chemical-biological indicator was removed from the chamber for sterility testing as described above in Example 1. The test resulted in no visible growth, indicating that sterility had been attained. The chemical indicator remaining in the chamber, upon continued exposure to the ethylene oxide gaseous atmosphere, exhibited a gradual and uniform change in the hue and intensity of its initially developed color, becoming light brown, then darker brown, then brownish red, and finally brick-red. The brick-red color developed after about 2½ hours, corresponding to an extent of exposure of 1075 milligram-hour per liter, thereby indicating a margin of safety in sterility of 931 milligram-hour per liter (1075 minus 144).

EXAMPLE 4

Ink compositions were prepared containing the following ingredients in the following parts by weight:

| | Ink E | Ink F | Ink G |
|---|---|---|---|
| Ethylene glycol | 180 | 202 | 182 |
| 4-benzylpryidine | 31 | 34 | 32 |
| 4-pyridinealdoxime | 8 | | |
| Meso-1,2-bis-(4-pyridyl)-1,2-ethanediol | | 9.8 | |
| 1,2-bis-(4-pyridyl)-ethylene | | | 30.5 |

A sterilization indicator capable of indicating sterility as well as the relative humidity range at the target area in a sealed package or in the sterilization chamber was prepared by printing three longitudinal bars from each of the indicating inks E, F, G, respectively, on a piece of 3½-inch by 1¼-inch pressure-sensitive adhesive paper label and allowing them to air-dry. The imprints were colorless and became invisible when dry. When exposed to the sterilization conditions at the relative humidity of zero to 50%, all the invisible imprint developed sharp and well defined color (pink to brick-red, orange, and brown for imprint from inks E, F, and G, respectively) when the extent of exposure to ethylene oxide is extensive enough to render the target area sterile. At relative humidity between 60% and 70%, the imprint from Ink E looked "soaked" or "washed" whereas the developed imprints from Ink F and Ink G still looked sharp and fresh. At relative humidity 80% and higher, the imprint from Ink F developed an orange color but was lacking freshness while the imprint from Ink G developed sharp brown to dark brown marking. At relative humidity of 90% and higher, the developed orange imprint from Ink F looked "soaked" and "washed"; the brown to dark brown imprint from Ink G looked sharp, or diffused, particularly at 100% relative humidity. With the aid of this indicator, sufficient information as to the relative humidity at the target area can be derived to determine whether the relative humidity is below, near, or above the optimal range.

EXAMPLE 5

Following the general procedure of the previous examples, inks were formulated employing the compounds set forth in the table below. The inks were applied to paper, dried, and then exposed to ethylene oxide. All of these indicators were colorless before exposure, and developed an initial color which gradually changed in hue and intensity upon continued exposure.

TABLE 1

| | Color developed | |
|---|---|---|
| Compound | Initially | Subsequently |
| 4-benzylpyridine | Yellow | Brown. |
| 2-benzylpyridine | do | Do. |
| Diphenyl-4-pyridinylmethane | do | Do. |
| 2-(4-chlorobenzyl)-pyridine | do | Do. |
| 2-(4-nitrobenzyl)-pyridine | Blue | Do. |
| 2-pyridinealdoxime | Yellow | Purple. |
| 2-vinylpyridine | do | Brownish. |
| 4-vinylpyridine | Light green | Dark green. |
| 1,2-bis-(4-pyridyl)-ethane | Yellow | Brown. |
| 1,2-bis-(4-pyridyl)-ethylene | Orange | Do. |
| Meso-1,2-bis-(4-pyridyl)-1,2-ethanediol | do | Do. |
| 5-hydroxyquinoline | Pink | Red. |
| 8-hydroxyquinoline | do | Do. |
| 7-hydroxyquinoline | Yellow | Brown. |
| 5-hydroxyisoquinoline | do | Do. |
| 8-hydroxyisoquinoline | do | Red. |
| 4-ethanolpyridine | Green | Greenish blue. |
| 3-pyridylcarbinol | Yellow | Brown. |
| Nicotinamide | do | Do. |
| 2-(4-nitrobenzyl)-pyridine hydrochloride | Blue | Do. |

Additional ink formulations which can be used in preparing sterility indicators are set out in the following table, in which all parts given are by weight.

TABLE 2

| Ink | H | I | J | K | L |
|---|---|---|---|---|---|
| Ethylene glycol | 895 | 895 | 358 | 268 | 368 |
| 4-benzylpyridine | 213 | | 192 | 171 | |
| 2-benzylpyridine | | 212 | | | 35 |
| Diphenyl-4-pyridinylmethane | | | 4 | | |
| 8-hydroxyquinoline | | | | 20 | |
| 2-pyridinealdoxime | | | | | 19.8 |

What is claimed is:

1. An indicator for monitoring a sterilization process employing an alkylating agent as the sterilization agent, said indicator visibly exhibiting a color change upon being subjected to a selected extent of exposure to said sterilization agent, comprising a carrier member bearing at least one indicating compound selected from the group consisting of

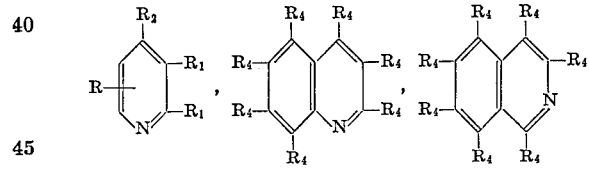

and salts thereof, wherein at least one and not more than two of the $R_1$ and $R_2$ groups are hydrogen; $R_1$ and $R_2$ are independently selected from the group consisting of hydrogen,

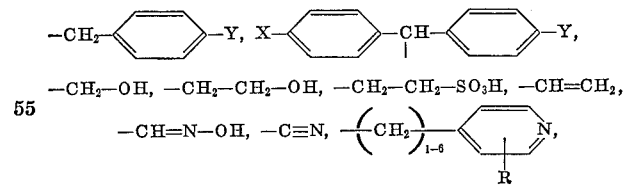

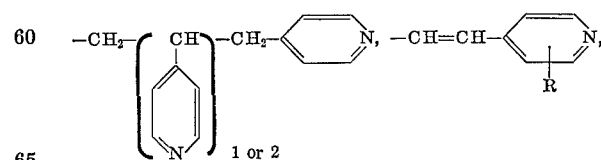

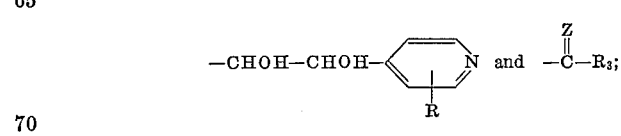

R is hydrogen, halogen or alkyl; X is hydrogen, —N═O, —NO$_2$, —OH, —SH, —CH═N—OH, alkyl or halogen, Y is hydrogen, —N═O, —OH, —SH, —CH═N—OH, alkyl or halogen, Z is oxygen or sulfur; $R_3$ is —OH, —NH$_2$, —NH—NH$_2$ or alkoxyl; at least one of the $R_4$ groups is —OH, —SH or —CH=N—OH, and the other $R_4$ groups are hydrogen.

2. An ink composition for printing telltale indicia, said ink composition exhibiting a color change upon being subjected to a selected extent of exposure to an alkylating agent, said composition comprising an organic solvent having a boiling point of at least 100° C. and at least one indicating compound as claimed in claim 1.

3. An indicator for monitoring a sterilization process employing an alkylating agent as the sterilization agent, comprising a carrier member bearing an exposure indicating portion and a sterility indicating portion, said exposure indicating portion visibly exhibiting a color change upon being subjected to a brief extent of exposure to said alkylating agent, said sterility indicating portion visibly exhibiting a color change upon being subjected to a selected extent of exposure to said alkylating agent sufficient to render sterility to the material being treated, each of said indicating portions comprising at least one indicating compound as claimed in claim 1.

4. A method of monitoring a sterilization process employing an alkylating agent as the sterilization agent comprising the steps of exposing to said alkylating agent the material to be sterilized and an indicator, which visibly exhibits a color change upon being subjected to a selected extent of exposure to said alkylating agent, and maintaining said alkylating agent in contact with said material and said indicator at least until said color change occurs in said indicator, said indicator comprising at least one of the indicating compounds of claim 1.

5. The method of claim 4 wherein ethylene oxide is employed as said alkylating agent.

6. The indicator of claim 1 wherein said indicating compound has the formula

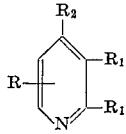

wherein at least one and not more than two of the $R_1$ and $R_2$ groups are hydrogen; $R_1$ is hydrogen or

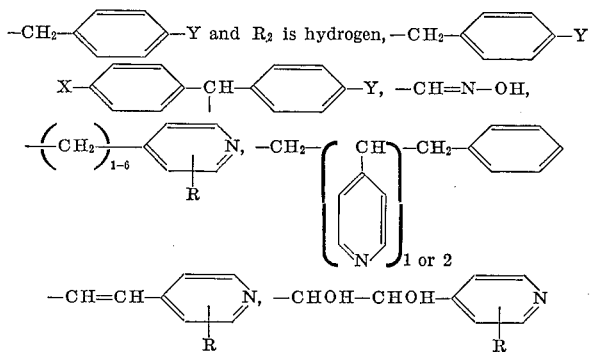

wherein X, Y and R are independently selected hydrogen, halogen, or alkyl having 1 to 4 carbon atoms.

7. The indicator of claim 6 wherein 1,2,3-tri-(4-pyridyl)-propane is employed as said indicating compound.

8. The indicator of claim 6 wherein 1,2,3,4-tetra-(4-pyridyl)-butane is employed as said indicating compound.

9. The indicator of claim 6 wherein said carrier member comprises a paper strip.

10. The indicator of claim 6 wherein said carrier member comprises a pressure-sensitive adhesive tape.

11. The indicator of claim 6 wherein said carrier member comprises an envelope adapted to contain material to be treated with said alkylating agent.

12. The indicator of claim 6 wherein said indicating compound is impregnated into said carrier member.

13. The indicator of claim 6 wherein said indicating compound is present on said carrier member as printed indicia.

14. A method of monitoring a sterilization process employing an alkylating agent as the sterilization agent comprising the steps of exposing to said alkylating agent the material to be sterilized and an indicator adapted to visibly exhibit a color change upon being subjected to a selected extent of exposure to said alkylating agent and maintaining said alkylating agent in contact with said material and said indicator at least until said color change occurs in said indicator, said indicator comprising at least one of the indicating compounds of claim 6.

15. The indicator of claim 6 wherein 1,2-bis(4-pyridyl)-ethylene is employed as said indicating compound.

16. An ink composition for printing telltale indicia, said composition exhibiting a color change upon being subjected to a selected extent of exposure to an alkylating agent, said composition comprising an organic solvent having a boiling point of at least 100° C. and at least one indicating compound as claimed in claim 15.

17. The indicator of claim 6 wherein 1,2-bis(4-pyridyl)-1,2-ethanediol is employed as said indicating compound.

18. An ink composition for printing telltale indicia, said composition exhibiting a color change upon being subjected to a selected extent of exposure to an alkylating agent, said composition comprising an organic solvent having a boiling point of at least 100° C. and at least one indicating compound as claimed in claim 17.

19. The indicator of claim 6 wherein 1,2-bis(4-pyridyl)-ethane is employed as said indicating compound.

20. An ink composition for printing telltale indica, said composition exhibiting a color change upon being subjected to a selected extent of exposure to an alkylating agent, said composition comprising an organic solvent having a boiling point of at least 100° C. and at least one indicating compound as claimed in claim 19.

21. The indicator of claim 6 wherein 4-pyridinealdoxime is employed as said indicating compound.

22. An ink composition for printing telltale indicia, said composition exhibiting a color change upon being subjected to a selected extent of exposure to an alkylating agent, said composition comprising an organic solvent having a boiling point of at least 100° C. and at least one indicating compound as claimed in claim 21.

23. An ink composition for printing telltale indicia, said composition exhibiting a color change upon being subjected to a selected extent of exposure to an alkylating agent, said composition comprising an organic solvent having a boiling point of at least 100° C. and at least one indicating compound as claimed in claim 6.

24. The ink composition of claim 23 wherein said organic solvent is selected from the group consisting of ethylene glycol, propylene glycol, glycerol, monoethers of ethylene glycol and monoethers of propylene glycol.

25. The ink composition of claim 23 wherein said indicating compound is present in an amount within the range of from about 0.1 to about 40% by weight.

26. A method of monitoring a sterilization process employing an alkylating agent as the sterilization agent comprising the steps of exposing to said alkylating agent the material to be sterilized and an indicator, which visibly exhibits a color change upon being subjected to a selected extent of exposure sufficient to render sterility to the material being treated, and maintaining said alkylating agent in contact with said material and said indicator at least until said color change occurs in said indicator, said indicator comprising at least one indicating compound selected from the group consisting of

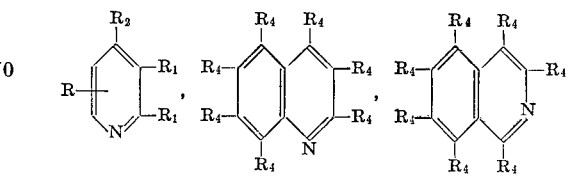

and salts thereof, wherein at least one and not more than two of the $R_1$ and $R_2$ groups are hydrogen; $R_1$ is selected from the group consisting of hydrogen,

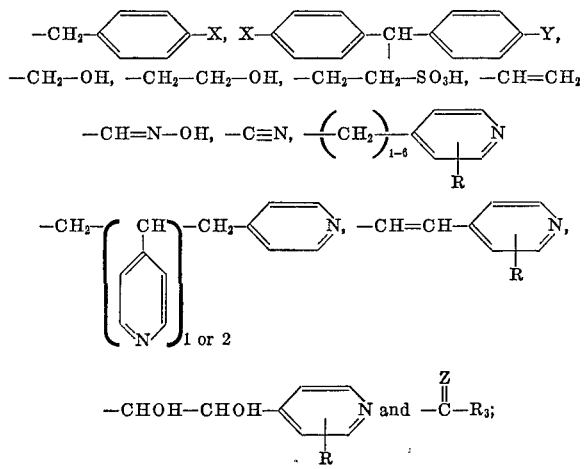

$R_2$ is selected from the group consisting of hydrogen,

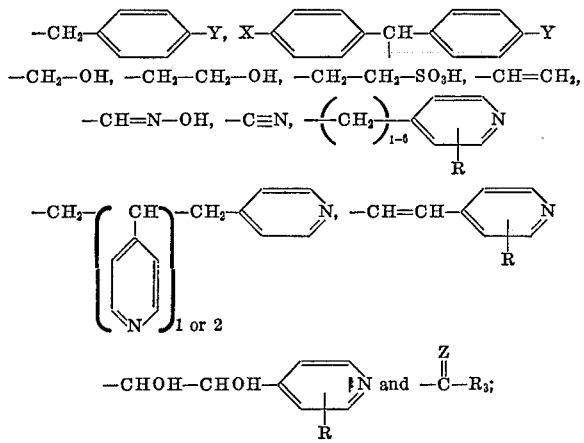

R is selected from the group consisting of hydorgen, halogen and alkyl; X is selected from the group consisting of hydrogen, —N=O, —NO$_2$, —OH, —SH,

—CH=N—OH alkyl and halogen; Y is selected from the group consisting of hydrogen, —N=O, —OH, —SH, —CH=N—OH, alkyl and halogen; Z is selected from the group consisting of oxygen and sulfur; $R_3$ is selected from the group consisting —OH, —NH$_2$, —NH—NH$_2$ and alkoxyl; at least one of the $R_4$ groups is selected from the group consisting of —OH, —SH and —CH=N—OH, and the other $R_4$ groups are hydrogen.

27. The method of claim 26 wherein ethylene oxide is employed as said alkylating agent.

28. A method of monitoring a dry heat sterilization process comprising the steps of exposing to said dry heat the material to be sterilized and an indicator adapted to visibly exhibit a color change upon being subjected to a selected extent of exposure to said dry heat, said indicator comprising at least one of the indicating compounds of claim 24.

References Cited
UNITED STATES PATENTS

| | | | |
|---|---|---|---|
| 3,098,751 | 7/1963 | Huyck | 106—20 |
| 3,258,312 | 6/1966 | Olson | 252—408 |
| 3,288,718 | 11/1966 | Carumpalos | 252—408 |

OTHER REFERENCES

John H. Brewer et al.: Journal of Pharmaceutical Sciences, 55 (1), 57–59 (1966).

MORRIS O. WOLK, Primary Examiner

S. MARANTZ, Assistant Examiner

U.S. Cl. X.R.

8—1, 4, 7, 8; 21—Dig. 4; 23—230 R, 253 T P, 254 R; 106—21, 22; 116—114 AM; 252—408; 260—283, 290

UNITED STATES PATENT OFFICE
CERTIFICATE OF CORRECTION

Patent No. 3,627,469     Dated  December 14, 1971

Inventor(s) SHU-SING CHENG

It is certified that error appears in the above-identified patent and that said Letters Patent are hereby corrected as shown below:

Column 4, line 20, delete "e" in halogene; line 50, "etiher" should read --either--; line 53, insert --Chem.-- after "Am."; line 74, insert --and-- before "by". Column 5, line 1, "preparted" should read --prepared--; lines 4 to 7, that portion of the formula reading -CH-⟨⟩ should read -CH-⟨⟩-Y.

Column 6, line 50, "fined" should read --finer--. Column 8, line 14, "for" should read --of--. Column 11, lines 47 to 50, that portion of the right hand formula reading ⟨⟩ should read ⟨N⟩. Column 14, line 1, "hydorgen" should read --hydrogen--

Signed and sealed this 20th day of June 1972.

(SEAL)
Attest:

EDWARD M. FLETCHER, JR.           ROBERT GOTTSCHALK
Attesting Officer                 Commissioner of Patents